March 16, 1965     R. BIRMANN     3,173,241
TURBOCHARGER INVOLVING A CENTRIPETAL TURBINE
Filed Aug. 29, 1955     4 Sheets-Sheet 1

INVENTOR.
RUDOLPH BIRMANN
BY
ATTORNEYS

INVENTOR.
RUDOLPH BIRMANN

March 16, 1965    R. BIRMANN    3,173,241
TURBOCHARGER INVOLVING A CENTRIPETAL TURBINE
Filed Aug. 29, 1955    4 Sheets-Sheet 3

INVENTOR.
RUDOLPH BIRMANN
BY
ATTORNEYS

March 16, 1965   R. BIRMANN   3,173,241
TURBOCHARGER INVOLVING A CENTRIPETAL TURBINE
Filed Aug. 29, 1955   4 Sheets-Sheet 4

INVENTOR.
RUDOLPH BIRMANN
BY
ATTORNEYS

United States Patent Office 3,173,241
Patented Mar. 16, 1965

3,173,241
TURBOCHARGER INVOLVING A CENTRIPETAL
TURBINE
Rudolph Birmann, Newtown, Pa., assignor, by mesne assignments, to De Laval Turbine Inc., Trenton, N.J., a corporation of Delaware
Filed Aug. 29, 1955, Ser. No. 530,966
8 Claims. (Cl. 60—13)

This invention relates to turbochargers for internal combustion engines.

Since the discharge of gases from a reciprocating internal combustion engine is intermittent, problems arise in securing proper driving conditions for a turbine utilizing these gases. If a turbine is connected to an engine by means of a single manifold common to all of the cylinders, the flow at the turbine inlet is smoothed out, which is desirable from the point of view of turbine operation but highly undesirable from the point of view of maximum recovery of the energy in the engine exhaust gases. If the turbine operates, for example, with an inlet pressure of ten pounds per square inch gauge, the pressure in any one cylinder at the instant that the exhaust valve opens can easily be as high as one hundred pounds per square inch gauge. It will be evident that with such a tremendous pressure drop the energy corresponding thereto is lost in a single manifold arrangement.

Proposals have, therefore, been made leading to the well-known blowdown turbine arrangement. In this system, cylinders having non-interfering exhaust phases are connected through separate manifold branches to separate chambers of a turbine nozzle box. This makes it possible for the exhaust gases to expand completely to atmospheric pressure during the beginning of the exhaust phase, so that during the remainder of the exhaust stroke the engine pistons are not required to pump against a back pressure. While theoretically this is desirable and beneficial to the operation of the engine, in practice it has been found that there are many serious drawbacks to the blowdown turbine arrangement. Chief among these is the fact that the turbine is forced to operate with pulsating or intermittent flow, entailing continual emptying and filling of all stationary and rotating blade passages. Furthermore, only a portion of the full turbine periphery is active at any one instant, the blades on the remaining part of the periphery being idle and causing high energy losses. Finally, the aforedescribed intermittent operation is connected with wide variations of the ratio of the peripheral and absolute components of flow velocity, with a corresponding wide divergence between the resulting flow angles and the actual blade angles. The losses caused by all of these factors are in most cases so great that the gain achieved by the utilization of the blowdown energy is offset, or more than offset, by the low turbine efficiency.

One solution to the problem involved is the utilization of a pulse converter system such as is described in my application Serial No. 360,500, filed June 9, 1953, now abandoned, but of which Patent 3,068,638 is a continuation. In such a pulse converter system, the energy in the exhaust pulsations is used to produce a pressure rise, by means of a suitable eductor and diffuser device, in such a manner that the engine operates effectively against a low back pressure, whereas the turbine has the benefit of a substantially higher pre-turbine pressure. In addition thereto, the turbine operates with full admission and steady flow; that is, under conditions where maximum turbine efficiency may be achieved.

The present invention provides another solution to this problem by making provisions for utilization of the energy in the exhaust pulsations while at the same time operating the turbine with full admission and steady flow. In accordance with the invention there is produced certain controlled flow phenomena in the turbine nozzle box, leading to the maximum recovery of the pulsating energy, while at the same time permitting the attainment of maximum turbine efficiency. The arrangement is particularly applicable to centripetal turbines; i.e., those involving a substantial radial inward component of flow of gases through the turbine passages.

It has been the conventional practice in all types of turbines to locate the stationary guide vanes for the driving gases as close as possible to the inlet edges of the rotating blades. In axial flow turbines it has been found that the smaller the clearance between stationary and rotating blades the better the turbine efficiency. The same practice has accordingly been applied to centripetal turbines. In the latter type of turbine, however, there is no reason for such close proximity. It can be shown theoretically that a vaneless radial passage which serves to accelerate the flow on a spiral path, directed inwardly, can provide a more efficient nozzle device for a centripetal wheel than conventional nozzle passages formed by guide vanes that are located in close proximity to the turbine blade inlet edges.

In accordance with one embodiment of the invention, a radially extending vaneless nozzle passage is utilized as a mixing section in which the flow, admittedly locally at the outer periphery at very high velocity, can so distribute itself that it becomes a uniform homogeneous flow by the time it enters the rotating turbine blades. The local admission of flow is through tangentially-directed nozzles in which each separate exhaust manifold branch terminates. These separate manifold branches receive gases from groups of cylinders which have non-interfering exhaust phases. Momentarily, during the initial phase of the exhaust period of any of one cylinder, a pressure wave travels through the exhaust manifold branch pertaining to it and is directed tangentially into an annular space surrounding the turbine wheel. This momentarily high velocity flow, issuing from one of the two primary nozzles in the device, produces an ejector effect on the other which causes the static pressure in the second to be low. In other words, a cylinder in the second manifold branch, which is at the end of its exhaust phase, can discharge against a relatively low back pressure. Momentarily the flow pattern at the maximum radius region of this vaneless space has the characteristics of solid body rotation, but this flow pattern gradually changes to vortex flow within the radial extent of the vaneless approach passage. This change occurs in accordance with natural laws of hydrodynamics, and no special guidance of the flow is required for this conversion. In common with the pulse converter system, mentioned above, eductor action takes place; i.e., entrainment of low velocity gases by high velocity flow, but contrary to the pulse converter flow phenomena, the need for conversion, in a diffuser, of the final mixing velocity into a pressure rise is obviated. The kinetic energy of the flow, after momentum transfer, is used directly in the turbine wheel, which is a more efficient treatment of the flow than can be achieved by first expanding and subsequently diffusing.

In another embodiment of the invention, these same general principles are involved in an arrangement in which a turbocharger receives exhaust gases from a pair of of cylinders (or from only one cylinder), with minimum length and volume of the exhaust conduits.

The general objects of the invention relate to the attainment of the foregoing results, and other objects, relating particularly to details of construction and operation, will become apparent from the following description read in conjunction with the accompanying drawings, in which.

Figure 4:
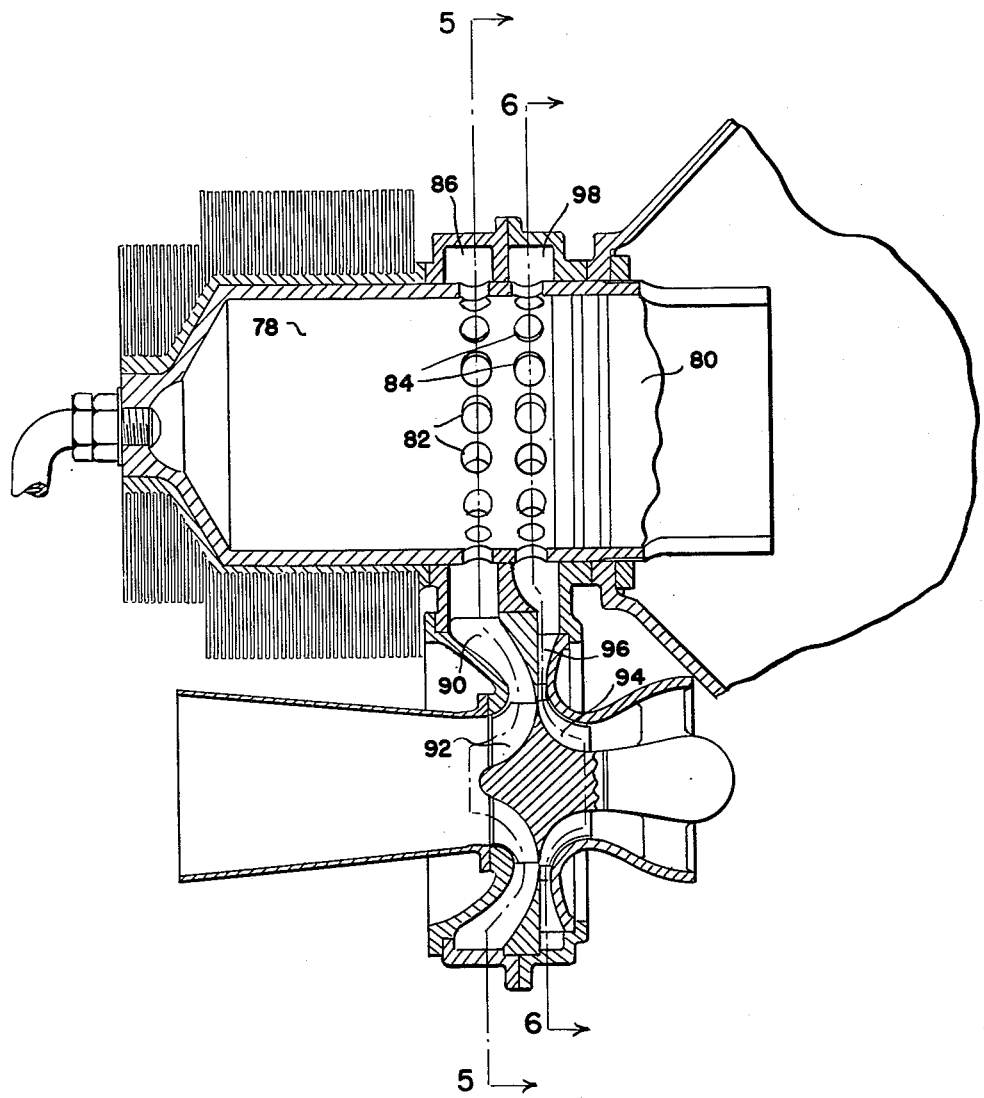
Figure 5:
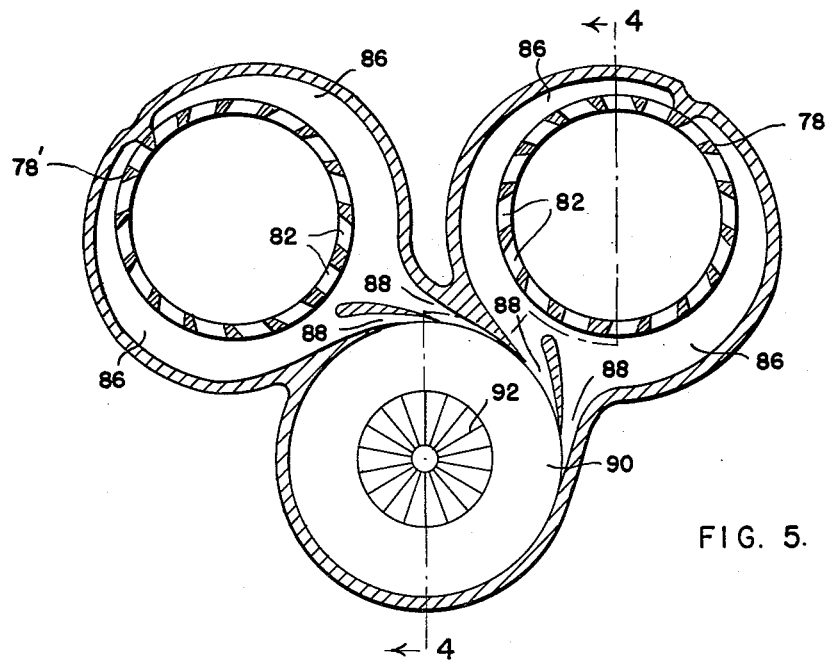
Figure 6:
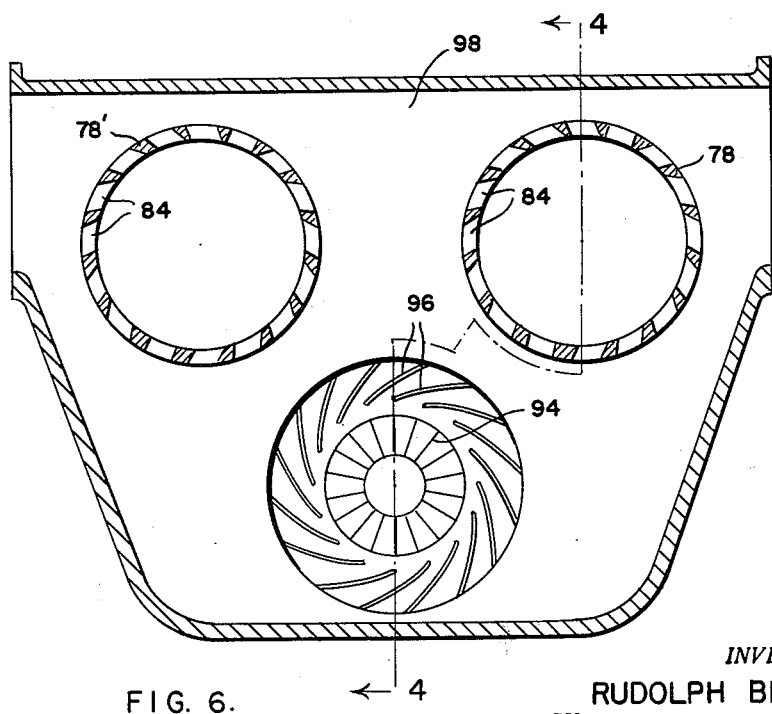

FIGURE 4 is a sectional view illustrating the association of a turbocharger with a pair of engine cylinders, the section being taken on the surface indicated at 4—4 in FIGURES 5 and 6; and FIGURES 5 and 6 are, respectively, sections taken on the surface indicated at 5—5 and 6—6 in FIGURE 4.

Figures 1, 3:
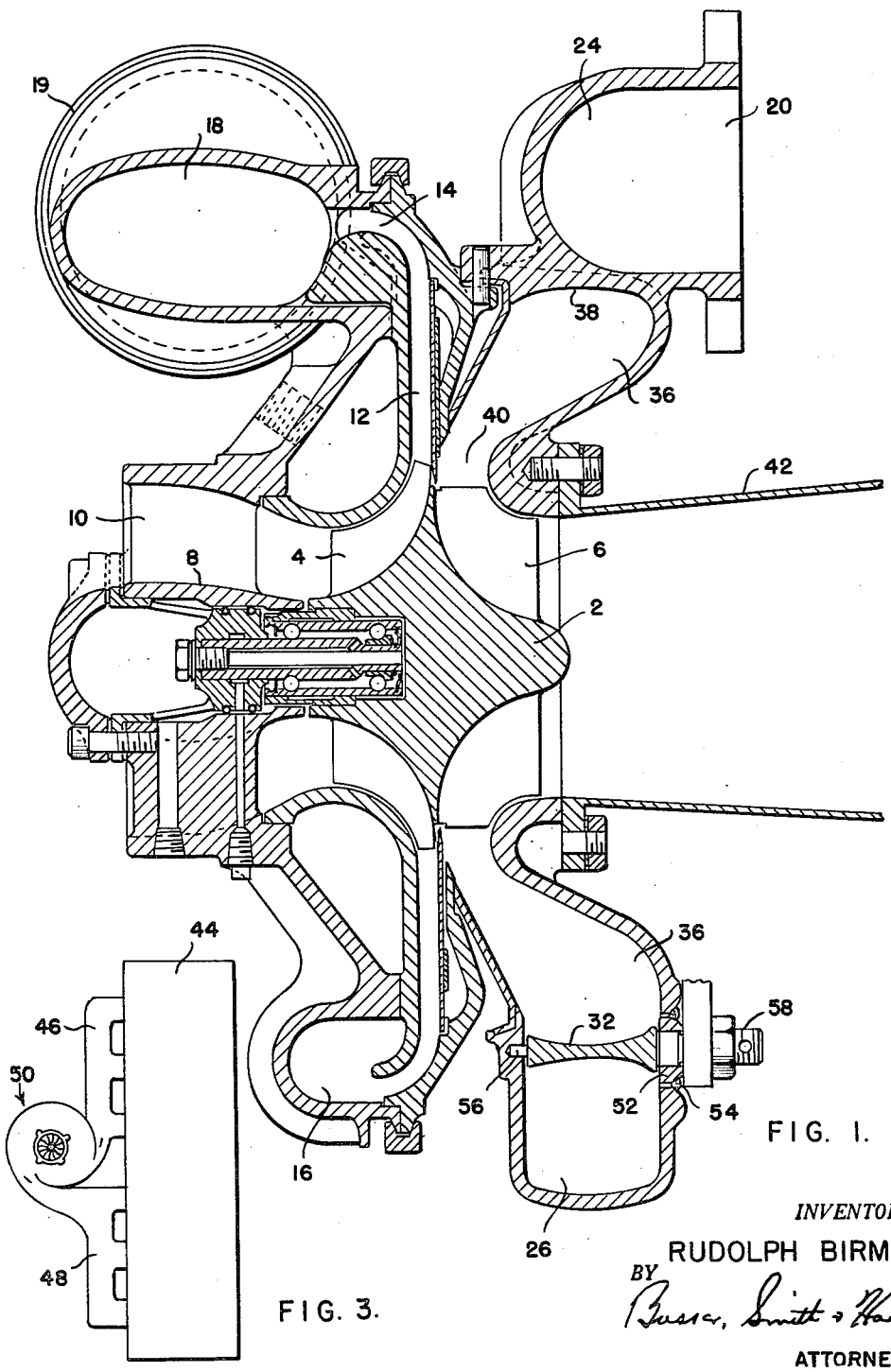
FIGURE 1 is an axial section through a turbocharger provided in accordance with the invention.
FIGURE 3 is a diagram showing the turbocharger in its association with an internal combustion engine.
Figure 2:
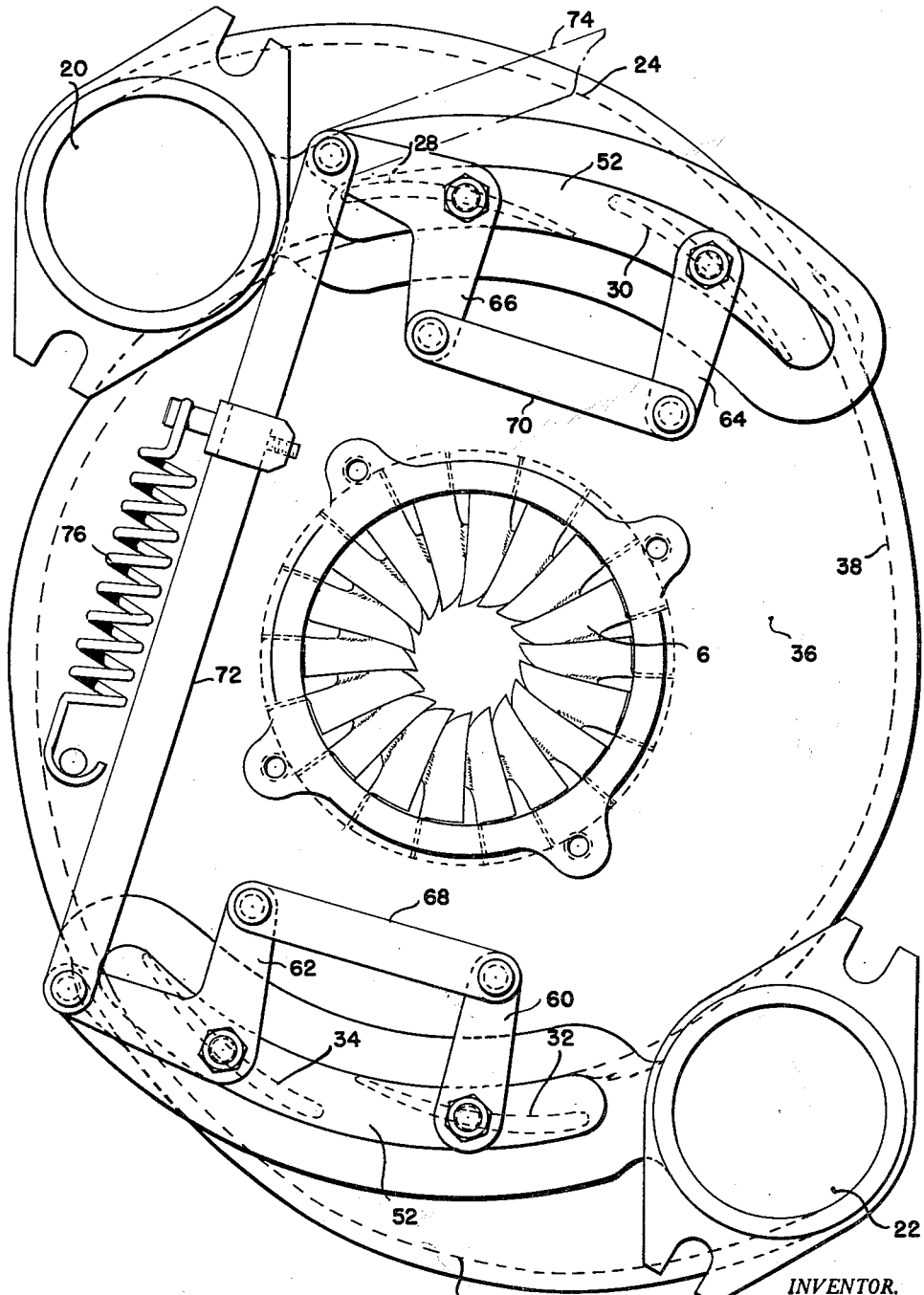
FIGURE 2 is an elevation of the same looking at the right of FIGURE 1.

The turbocharger shown in FIGURES 1 and 2 comprises a rotor having the hub portion 2 and carrying at opposite axial ends thereof compressor blades 4 and turbine blades 6, the rotor being of the monorotor type particularly described in my Patent No. 2,709,893, dated June 7, 1955. The blading is designed for high efficiency, preferably in accordance with my Patents 2,943,039 and 3,032,315.

As shown, the rotor is mounted in overhung fashion from the bearing housing 8, of the type described in my Patent 2,911,138, dated November 3, 1959. Air is received through the inlet portion 10 of the compressor housing, and is delivered by the blading at 4 into a vaneless diffuser 12 from which delivery takes place into the volute comprising the passages 14, 16 and 18 in the form of a spiral of increasing cross-sectional area. The air is delivered through the outlet 19 of the housing to the engine, which is to be supercharged and/or scavenged depending upon its type. As will be evident from the preceding and following descriptions, the invention is applicable to the turbocharging of all types of internal combustion engines operating in four-cycle or two-cycle fashion.

In the example illustrated herein, exhaust gases from the engine are delivered from two groups of cylinders through passages 20 and 22 into chambers 24 and 26, respectively of the turbine casing, from which the gases are directed by pairs of blades 28 and 30, and 32 and 34 into a vaneless nozzle chamber 36, from the innermost portion 40 of which the gases enter the passages defined by the turbine blades 6 for inward flow and expansion therein, the gases being ultimately discharged from the turbine blading through exhaust diffuser 42 which is desirably provided so that the pressure at the exit from the turbine passages is subatmospheric.

The association of the turbocharger with an internal combustion engine is diagrammed in FIGURE 3, wherein the engine, which may be of four-cycle or two-cycle type, is indicated at 44, and may be assumed to have six cylinders, one group discharging into manifold branch 46 and the other into manifold branch 48 which may be regarded as connected respectively to the inlets 20 and 22 previously described, the turbocharger being indicated generally by the numeral 50. The cylinders associated with each of the manifold branches 46 and 48 are those which do not have interfering exhaust phases; i.e., only one of the cylinders associated with a manifold branch is undergoing its exhaust phase at any one instant. On the other hand, a cylinder associated with, say manifold branch 46 may be in its exhaust phase, for example the initial portion thereof, at the same time that a cylinder associated with the other manifold branch 48, is in the latter portion of its exhaust phase. In the event that a larger number of cylinders is involved so that they cannot be grouped without exhaust phase interference for discharge through only two manifold branches one or more additional manifold branches may be provided, separately exhausting into the gas receiving arrangement. In other words, there may be more than two such inlet passages as are indicated at 20 and 22 suitably disposed about the periphery of the chamber 36.

The design and operational features may now be described.

Assuming that discharge from one cylinder is just beginning through the connection 20, the gases are directed at high velocity through the passages defined by the blades 28 and 30 tangentially into the outermost portion of the chamber 36. The blades 28 and 30 are desirably made adjustable (as hereafter more fully indicated) to secure the proper area for the flow through the guide vane passages in dependence upon the typical operating conditions of the engine. In any event, the gases initially entering flow at high velocity about the outer periphery 38 of the chamber 36. In doing this they sweep past the blades 32 and 34 and produce an ejector action to draw gases from the inlet 22 by virtue of reduction of pressure. If one of the cylinders connected to the passage 22 is in the terminal portion of its exhaust phase, the back pressure on the piston of that cylinder is reduced, which, of course, results in higher efficiency for the cycle of that cylinder. In particular, the arrangement is such that in the optimum case increase in back pressure is prevented, so that the engine operates under no worse conditions than those which would exist for its exhaust phases if the turbocharger were absent. Adjacent to the periphery 38 of the chamber 36, the flow is pulsating and at any instant is of "solid body" type; i.e., adjacent to the periphery of the chamber, the flow has the general characteristic that the tangential component of velocity is approximately proportional to the radius. The flow, however, is constrained to spiral inwardly by reason of the introduction of mass flow at the periphery of chamber 36 and withdrawal of gases at the periphery of the turbine blading, and in this spiral flow, unimpeded by any guide vanes, a transition occurs which involves not only smoothing out of the pulsations at the periphery but a transformation as well to vortex flow, which has the characteristic that the tangential component of velocity is substantially inversely proportional to the radius. In other words, radially inward, beyond the aforementioned transition in this spiral flow, the peripheral velocity increases with decrease of radius, as is highly desirable for introduction into the turbine rotor, which operates at high rotational speed. In view of the transition from pulsating to steady flow, and from relatively low peripheral velocity to high flow velocity at the entrance to the turbine blading, all requirements for the achievement of optimum performance of a high-rotational-speed turbine are met. Since at the radius at which the flow enters into the turbine blading the velocity of the gases is uniform, the design of the turbine blading may be based on normal velocity and steady flow, with resultant high efficiency of the turbine. Flow of gases to the turbine takes place, of course, throughout its entire periphery at all times.

It may be stressed that the transition to vortex flow is due to the natural laws of hydrodynamics, and not to any particular shaping of the chamber 36. This is true, however, only if the chamber 36 is of adequate radial extent and it is important to dimension properly the vaneless approach passage to achieve the highest efficiency. If the passage were made radially too deep, even though this would most fully smooth out the pulsations and complete the transformation to uniform vortex flow, the wetted surfaces would become too large, and consequently friction losses would be too high. On the other hand, if the radial space is too shallow, there is not enough distance and volume available for good momentum transfer involving sufficiently complete smoothing out of the pulsations and the setting up of vortex flow at sufficiently high and uniform velocity for proper entrance into the turbine blading. However, the dimensioning of the chamber of passage 36 is not highly critical and it may be stated that optimum results are secured if the design is such that any one flow particle issuing from the primary nozzles provided by the blades 28, 30, 32 and 34 is forced to make one full turn of 360° before entering the turbine blading and not more than three full turns before entering this blading. The dimensions of the passage 36, as to its radial extent, its cross section, and its reduction in axial extent toward the turbine wheel entrance region 40, are dependent upon the conditions of operation of the engine and the volume and velocity of gases expected from normal operation. It is impossible, therefore, to give any general dimensional specifications, but it will be evident to those skilled in the art that, given the characteristics of operation of the engine, from which the volume of exhaust gas available under normal operating conditions can be determined, there may be derived from this the velocities of entrance of the gases into the periphery of passage 36 through the passages between the blades 28, 30, 32 and 34, and from instantaneous velocities an average velocity is ascertainable, and from this, taking into account volumes involved, the passage 36 may have its shape readily calculated to secure the desirable results, above stated, of insuring that each flow particle makes between one and three complete revolutions before entering the turbine passages. The change of cross-section of the flow may also be designed to suit the desirable operating conditions of the turbine; i.e., a velocity of vortex flow may be secured to match the desired turbine speed, and the inlet angles at the periphery of the turbine blades may be designed to fit this condition in accordance with conventional design practice. A proportioning of the passage 36 as illustrated in FIGURE 1 is, for example, suitable for a typical condition.

In many cases, the blades 28, 30, 32, and 34 may be fixed in position, this being particularly true when the engine operates at approximately constant speed and under approximately constant load. However, when wide variations of speed and/or load are encountered, the blades are desirably adjustable, and for this purpose each of the blades is mounted on trunnions 56 and 58, the latter being desirably mounted in members 52 welded at 54 to close slots in the housing. The trunnions 58 are extended as shafts on which are secured lever arms such as 60, 62, 64 and 66 which may be interconnected by links such as 68, 70 and 72 for operation through a connection such as provided by the link 74 acting in opposition to a spring 76 which urges the link 72 downwardly as viewed in FIGURE 2 and the blades toward closed position.

The blades thus arranged for adjustment may be controlled by any of a number of regulating forces provided, for example, from a speed governor sensitive to the speed of the engine, by intake manifold pressure, by movement of the engine fuel rack, or the like.

Alternately there may be omitted an external connection such as 74, in which case the gas pressure forces acting on the guide vanes themselves may position them against the action of a spring such as 76 to secure the desired characteristics of operation. Under such circumstances, the guide vanes may be opened with increasing gas pressure, and vice versa.

In the event that adjustable guide vanes are to be provided which, however, are fixed during normal operation, the lever and linkage described may be omitted and the trunnions 58 held in fixed position by means of nuts and lock washers.

In the modification of the invention above described, it has been assumed that the turbocharger is operated by the exhaust gases from a number of cylinders exceeding two, for example, six cylinders as indicated in FIGURE 3. It will be evident that this involves manifold branches of substantial volume between the cylinders and the gas chamber feeding the turbine, together with extended linear paths of flow and deviations of the direction of flow. When more than two cylinders are thus involved such conditions are essentially inevitable, but where the turbocharger may be operated from two cylinders only, the invention lends itself to a simple structure in which the most desirable condition is secured of having the lengths and volumes of the passages involved a minimum. This is particularly advantageous in the case of engines of two-cycle type. FIGURES 4, 5, and 6 illustrate an embodiment of the invention in which the turbocharger is driven by the exhaust gases from two adjacent cylinders which have non-overlapping exhaust phases and which are charged by the turbocharger.

There are illustrated two cylinders 78 and 78' which supply the exhaust gases and which are to be assumed to involve non-overlapping exhaust phases. Each of the cylinders is provided with a piston 80, exhaust ports 82 and scavenging or charging ports 84. The exhaust ports 82 discharge into an exhaust belt 86 desirably formed in two parts in connection with each cylinder as illustrated in FIGURE 5. Nozzle passages 88 are provided to direct the exhaust gases from the exhaust belts of the two cylinders substantially tangentially into the annular gas chamber 90 surrounding the blading 92 of the turbine of the turbocharger which may have the same structural features as have already been described. In the chamber 90 there occur the same transformations which have been described above involving the transformation of "solid body" type of flow to vortex flow with smoothing out of the pulsations, thereby securing continuous supply of gases to the turbine throughout its periphery and substantially at uniform high velocity. The compressor blading 94 supplies air through a diffuser 96 to the belt 98 surrounding the scavenging or charging ports 84.

The arrangement just described provides exhaust passages of a very low volume and of direct linear nature between the exhaust ports of the cylinders and the turbine. At the same time since only one of the two cylinders is discharging at a given instant, an ejector action is achieved, affecting the exhaust belt of the cylinder which is not discharging, and preventing the pressure waves from propagating into the exhaust belt of this cylinder. The turbine operates with full admission and steady flow, and, therefore, under conditions of full efficiency, there is full utilization of energy in the exhaust pulsations. The nozzle passages 88 associated with each cylinder and which direct the exhaust gases into the vaneless whirl chamber 90 should have a total cross-sectional area smaller than the area of the corresponding cylinder exhaust ports.

While the invention has been shown as applied to a ported loop-scavenging two-cycle engine, it may be obviously applied to a uniflow poppet valve type of two-cycle engine, and it may also be applied to four-cycle engines, though due to their characteristics of operation, the value of the invention is less marked in its application to four-cycle engines.

It will be evident that the invention may be applied in various ways without departing from the scope thereof as defined in the following claims.

What is claimed is:

1. In combination with a multi-cylinder internal combustion engine, a turbocharger comprising a compressor arranged to supply air to said engine and a turbine arranged to receive driving exhaust gases from said engine and to drive said compressor, said turbine comprising a rotor of centripetal type provided with blades providing passages disposed to receive gases having a substantial radially inward component of motion, and means defining an annualr chamber surrounding said rotor and having free communication with said rotor about the entire circumference thereof, said means being vaneless and providing unobstructed flow of gases to said rotor, and means providing nozzles spaced around the periphery of said chamber for directing said driving gases directly from the cylinders of said engine approximately tangentially into the outer most portions of said chamber, said defined chamber having substantial radial extent sufficient to provide for conversion of pulsating flow at its periphery into relatively smooth vortex flow in the region of entry of the gases into the rotor passages.

2. The combination according to claim 1, wherein each of said nozzles receives exhaust gases from a group of said cylinders which have non-overlapping exhaust phases.

3. The combination according to claim 1, wherein the axis of said turbine is parallel to the axes of said cylinders.

4. A turbine according to claim 1 in which the radial extent of said annular chamber is sufficient to require the entering exhaust gases to make approximately one to three complete revolutions about the rotor axis before entrance into the rotor passages.

5. A turbine according to claim 1 in which said means providing nozzles are adjustable to control the nozzle passages.

6. A turbine according to claim 4 in which said means providing nozzles are adjustable to control the nozzle passages.

7. In combination with a two-cycle internal combustion engine having a pair of parallel cylinders operating with non-overlapping exhaust phases with each cylinder provided with exhaust ports discharging into an exhaust belt surrounding a cylinder, a turbocharger comprising a turbine arranged to receive driving exhaust gases from said cylinders and a compressor driven by said turbine and arranged to supply air to said engine, said turbine comprising a rotor of centripetal type provided with blades providing passages disposed to receive gases having a substantial radially inward component of motion, and means defining an annular chamber surrounding said rotor and having free communication with said rotor about the entire circumference thereof, said means being vaneless and providing unobstructed flow of gases to said rotor, and means providing nozzles for directing driving gases directly from said exhaust belts approximately tangentially into the outermost portions of said annular chamber, said defined chamber also having substantial radial extent sufficient to provide for conversion of pulsating flow at its periphery into relatively smooth vortex flow in the region of entry of gases into the rotor passages, the turbine axis being parallel to the axes of said cylinders.

8. In combination with a two-cycle internal combustion engine having a pair of cylinders operating with non-overlapping exhaust phases with each cylinder provided with exhaust ports discharging into an exhaust belt surrounding the cylinder, a turbocharger comprising a turbine arranged to receive driving exhaust gases from said cylinders and a compressor driven by said turbine and arranged to supply air to said engine, said turbine comprising rotor of centripetal type provided with blades providing passages disposed to receive gases having a substantial radially inward component of motion, means defining an annular chamber surrounding said rotor and having free communication with said rotor about the entire circumference thereof, said means being vaneless and providing unobstructed flow of gases to said rotor, and means providing nozzles for directing driving gases directly from said exhaust belts approximately tangentially into the outermost portions of said annular chamber, said defined chamber also having substantial radial extent sufficient to provide for conversion of pulsating flow at its periphery into relatively smooth vortex flow in the region of entry of the gases into the rotor passages.

References Cited in the file of this patent

UNITED STATES PATENTS

| | | |
|---|---|---|
| 1,152,361 | Thomas | Aug. 31, 1915 |
| 1,354,786 | Tartrais | Oct. 5, 1920 |
| 2,201,682 | Johansson | May 21, 1940 |
| 2,390,506 | Buchi | Dec. 11, 1945 |
| 2,607,189 | Chilton | Aug. 19, 1952 |

FOREIGN PATENTS

| | | |
|---|---|---|
| 168,357 | Austria | May 25, 1951 |
| 474,916 | Canada | July 3, 1951 |
| 918,317 | France | Oct. 14, 1946 |
| 684,332 | Germany | Nov. 25, 1939 |
| 630,164 | Great Britain | Oct. 6, 1949 |
| 158,334 | Switzerland | Feb. 16, 1933 |